Figure 1:
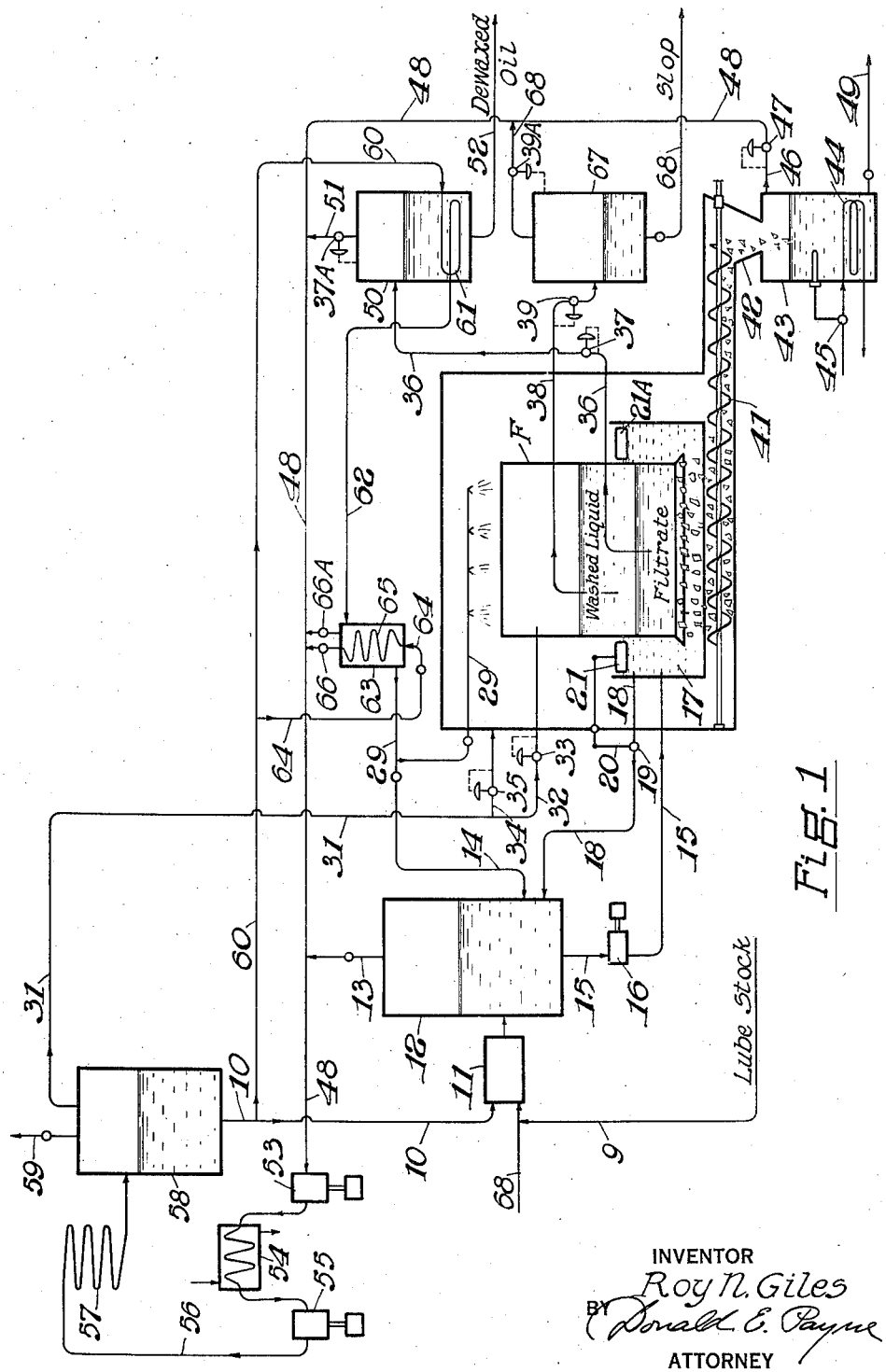

May 25, 1937.  R. N. GILES  2,081,397
METHOD OF OPERATING A CONTINUOUS FILTER SYSTEM
Filed March 1, 1934  2 Sheets-Sheet 1

INVENTOR
Roy N. Giles
BY Donald E. Payne
ATTORNEY

May 25, 1937.   R. N. GILES   2,081,397
METHOD OF OPERATING A CONTINUOUS FILTER SYSTEM
Filed March 1, 1934   2 Sheets-Sheet 2

INVENTOR
Roy N. Giles
BY Donald E. Payne
ATTORNEY

Patented May 25, 1937

2,081,397

UNITED STATES PATENT OFFICE 2,081,397

METHOD OF OPERATING A CONTINUOUS FILTER SYSTEM

Roy N. Giles, Hammond, Ind., assignor to Standard Oil Company, Chicago, Ill., a corporation of Indiana Application March 1, 1934, Serial No. 713,484

8 Claims. (Cl. 196—19)

The principal object of my invention is to provide a practical and efficient method of operating a continuous process for filtering wax-bearing oils in very light solvents.

The methods of filtering wax from wax-bearing oils dissolved in light solvents which have been generally in use heretofore are intermittent, in that the press soon becomes filled with wax which must be removed. The frequent cleaning of the presses entails loss of time and increases the expense of operation. Various types of apparatus for the continuous filtering of waxy oils have been devised but have not proved satisfactory for very light solvents when operated by the conventional methods. In usual refinery operations, using solvents such as propane, a certain desired pressure drop is obtained by maintaining the propane at two different temperatures, the lower temperature being attained by evaporation of a portion of the liquid propane. In the specific problem of operating a continuous filter the pressure drop takes place across the filter medium and the two different temperatures would be that of the unfiltered slurry on one side and that of the clarified filtrate on the other. The liquid phase in the slurry is of necessity saturated with wax. Therefore evaporation of solvent from the liquid phase upon passage through the filter medium must cause precipitation of wax. This precipitation takes place in the fiber of the fabric and soon renders it progressively more impervious to the passage of liquid. The filter rate is correspondingly cut down and the efficiency of the filter lowered until no appreciable filtration takes place.

I have invented a method of operating such continuous filters which prevents the above described difficulties from taking place. My method operates without the complication of a gaseous substance other than vapor of the solvent itself. In this method the slurry, which has been independently chilled to the desired temperature, is introduced into the filter apparatus which will allow a relatively large ratio of volume to surface area of the slurry.

Pressure is exerted upon the surface of the slurry by the vapors of the solvent. This pressure is always greater than the vapor pressure of the solvent in the slurry. The filter medium is immersed in this liquid and on the low pressure or clear filtrate side a pressure is maintained by vapors of the solvent, which pressure is slightly greater than, or at least equal to, the vapor pressure of solvent in the clarified filtrate. The pressure on the slurry is always maintained at a differential of a few pounds only over that of the clear filtrate. This condition of non-equilibrium is maintained by virtue of the following: First, the surface area is small compared to the volume of liquid slurry; second, the filter rate is rapid; third, the condensed solvent forms only a surface film of low gravity which has no tendency to convection, and fourth, the diffusion of liquid from the surface into the body is too slow to be a disturbing factor.

The advantage of a continuous process when operated by my method are: First, I obtain by continuous filtration a much higher filter rate than can be realized by present types of presses; second, by having a continuous removal of the wax cake I am able to handle any type of wax cake which therefore permits me to dewax any type of stock; third, I am able to obtain a high yield of oil and fourth, the washing of the cake is very efficient. Also my method entails less operating expense, fewer acts of manipulation and less investment in tankage, pumps, lines, etc., per unit of electricity. The qualities of the products are in every way equal to or superior to those of products from batch operation. Further objects and advantages will be apparent from the following detailed description.

Figure 2:
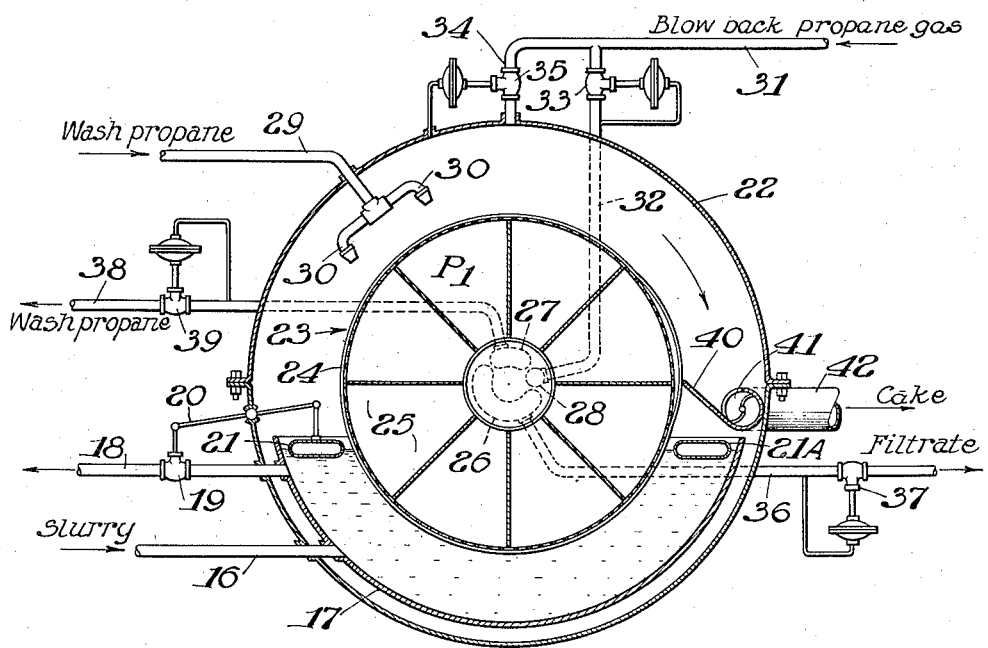
Figure 3:
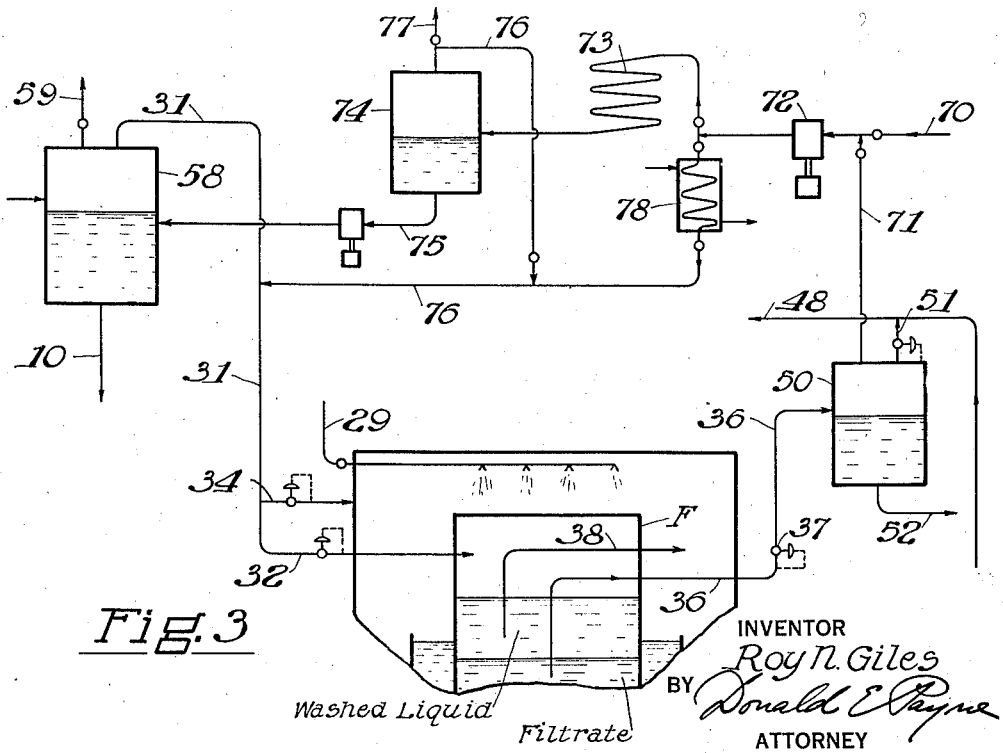

In the accompanying drawings which form a part of this specification and in which similar parts are designated by black reference characters in the several views, Figure 1 is a diagrammatic plan of my improved filter system;

Figure 2 is a diagrammatic cross sectional view of the filter indicating the pressure regulation features; and Figure 3 is a modified plan of a system employing a non-condensable blow-back gas.

In describing my invention I will refer to propane as a diluent, but it should be understood that this is merely an example of light, normally gaseous diluents and that I may use butane, ethane, propylene, butylene, methyl chloride, methyl ether, etc., or with equivalent substances either alone or in admixture with each other. The present invention is not dependent upon the use of any particular diluent, but relates to an improved method and apparatus for employing any normally gaseous or easily condensable diluent.

The invention will be described as applied to an S. A. E. 50 distillate lubricating oil stock prepared from Salt Creek crude, but it should be understood that the invention is applicable to any wax-bearing oil whether it is a distillate or a residual stock and whether or not it has been acid treated, solvent extracted, clayed, etc.

The waxy lubricating oil stock is introduced through line 9 and propane is introduced through line 10. The oil stock may be dissolved in the propane and may be chilled by auto-refrigeration or by any other means in crystallizing plant 11 as disclosed in my prior Patent No. 1,943,236. The particular method of chilling forms no part of the present invention and it is sufficient to point out that a filterable propane-oil-wax slurry may be obtained by any known process and introduced into wax slurry feed tank 12, this tank acting as a supply reservoir for the slurry which is charged to the filter. This slurry preferably contains about one part of oil to three parts of propane by volume. The slurry is preferably maintained at a temperature of about −40° F. The low temperature may be maintained by removing propane vapors through pipe 13 and propane sufficient to provide this cooling and to supply necessary diluent may be introduced through line 14 from a cooled propane source.

The filterable wax slurry is transferred from tank 12 through line 15 by pump 16 to the feed bowl 17 of a continuous filter. The slurry is introduced more rapidly than it is filtered and the excess slurry is returned to feed tank 12 through pipe 18 in amounts regulated by valve 19 which is operated by control 20 actuated by float 21 which in turn is supported on the surface of the slurry in feed bowl 17. Floats 21A may be used to protect the surface of the slurry from the warmer blow-back gases as will be hereinafter described.

The continuous filter (see Figure 2) may be of any well known type and as a preferred example I will describe the use of a cylindrical filter having an insulated gas tight pressure casing or shell 22 enclosing a drum 23 having a filter element 24 on its periphery and provided with segments 25 connected by sliding ports first to the filtrate discharge slot 26, then to the wash liquid slot 27, and finally to the blow-back slot 28. Cold wash propane is introduced through pipe 29 and may be sprayed onto the cake by perforated pipes or nozzles 30.

Pressure is maintained between the filter shell and the drum by means of propane gas from line 31. A portion of this gas is introduced through line 32 as blow-back to facilitate cake discharge, the amount of gas introduced being controlled by pressure regulator 33. Gas is also introduced at a somewhat lower pressure directly between the shell and the filter element through pipe 34 regulated by pressure regulating valve 35.

Filtrate may be withdrawn through pipe 36 in amounts controlled by pressure regulating valve 37 and wash propane may be withdrawn through pipe 38 through pressure regulated valve 39. The pressure in these lines is preferably controlled after operation is under way, by pressure controlled valves or the vapor discharge pipes which lead from the storage tanks to which pipes 36 and 38 are respectively connected. The wax cake is removed from the filter element by scraper 40 and conveyed by scroll conveyor 41 through conduit 42 to a wax pot.

An outstanding feature of my invention is the careful control of pressure in the various parts of the system, so that the evaporation and condensation of propane can be controlled to supply the necessary refrigeration and pressure differentials without impairing cold test of finished oils, plugging the filter elements, etc. I have discovered that when large pressure differentials are employed in a system which uses exclusively a condensable gas like propane, the high pressure causes an excessive condensation of propane in the wax slurry and particularly on the wax cake which warms up the wax cake, redissolves wax, and carries the wax into and through the filter element. I have also discovered that if the pressure on the filtrate side is not maintained above the vapor pressure of the filtrate there will be a flashing of diluent from the inner filter surface which will cause a deposition of viscous oil and wax in the pores of the filter thereby clogging the filter and impairing if not actually stopping the flow of diluted oil or wash liquid therethrough.

In practicing my invention I preferably maintain a small differential, about two to eight pounds, between the outside and inside of the filter element and I maintain the pressure on the inside of the filter element higher than the vapor pressure of the filtrate. Thus if the average temperature of the slurry is −15° F. and if the theoretical vapor pressure of the slurry is 16 pounds, I maintain a pressure inside the rotating drum ($P_1$) of 16.8 pounds and I maintain a pressure between the filter element and the filter shell of 20 pounds, giving a filtering pressure differential of 3.2 pounds. Under these conditions a uniform wax cake is formed at all times and filtration can be continued indefinitely giving filter rates upwards of one gallon of dewaxed oil per square foot of filtering area per hour. If an attempt is made to operate a system of this type with a pressure inside the drum ($P_1$) less than the vapor pressure of the filtrate, evaporation of diluent will occur both from the filtrate and from the inner surface of the filter cloth and filtration will practically cease.

Although I do not use extremely high propane pressures between the shell and drum, these pressures are higher than the vapor pressures of the slurry and unless there is little or no space between feed bowl 17 and drum 23 I prefer to use floats 21A to cover the surface and prevent the condensation of propane gas in the wax slurry.

Another important feature of my invention is the utilization of gases in the shell (from the blow-back gas, wax pot, filter slurry, etc.) to effect the final washing of the filter cake. Since the shell gas is at slightly higher pressure than the vapor pressure of the wax cake composition there will be a slight condensation of this gas throughout the entire surface of the wax cake which is exposed. This surface condensation takes place in a very short interval of time and the amount of wax dissolved is negligible. The condensation occurring first only on the surface of the wax cake, it is sufficient to drive the last remaining wash liquid out of the wax cake. This use of shell gas to supply wash liquid has been found to greatly improve the quality of the cake and to facilitate an even, uniform cake discharge.

Referring once more to Figure 1, the wax cake which is forced by scroll 41 through conduit 42 to wax pot 43 is melted in said wax pot by steam coil 44, the amount of steam being regulated by thermostatically controlled valve 45. Propane vapors are withdrawn through pipe 46 through pressure-controlled valve 47 and low pressure gas line 48. Wax is withdrawn from the base of the pot through pipe 49. An important feature of this arrangement is the countercurrent use of propane gas flowing back through conduit 42 toward the filter. This propane gas is condensed by the approaching wax slurry, so that the wax slurry is both warmed and diluted, thereby minimizing the amount of work required by the scroll. In fact, a portion of the propane between the filter shell and drum may come from this wax scroll system; thermostatically controlled valve 45 and pressure-controlled valve 47 may play an important part in maintaining the required gas pressure in the filter shell.

The filtrate is introduced by pipe 36 to collector tank 50 from which vapors are vented through line 51 and pressure-controlled valve 37A to low pressure gas line 48. When the filter is just beginning to operate it may be necessary to employ pressure control 37, but during the normal operation I prefer to open valve 37 and to employ the pressure control on valve 37A. The cold filtrate is warmed by a heat exchange which will be hereinafter described and this warmed filtrate is then passed by means of pipe 52 to suitable stills for removing diluent which is condensed and returned to diluent storage in the conventional manner.

Gases from low pressure gas line 48 discharge into the inlet side of compressor 53. This compressor discharges to intercooler 54 and the cooled gases from the intercooler are then passed through compressor 55, line 56 and condenser 57 to propane storage tank 58. Intercooler 54, between stages of compression lessens compression costs to a considerable extent.

The pressure in propane storage tank 58 is maintained within safe limits by a suitable safety valve in line 59 which may lead to fuel gas lines, absorption systems, compressors, etc. This may be used to purge out any air that may be drawn into the system.

Propane is passed through liquid line 60 to cooling coils 61 in filtrate receiver 50, so that the refrigeration value of the filtrate may be utilized. The cooled propane may then be passed through line 62 to cooler 63 which is cooled by the vaporization of propane introduced through pipe 64, vaporized in coils 65 and released through valve 66 to low pressure gas line 48. The propane in cold propane tank 63 supplies the propane for washing the filter through pipe 29 and supplies propane for cooling and diluting the wax slurry through line 14. I may, of course, effect cooling in tank 63 by venting vapors directly therefrom to low pressure gas line 48 through valve 66A.

The wash filtrate from the filter is introduced by pipe 38 to storage tank 67 which may be provided with a heat exchanger similar to that described for tank 50. The wash filtrate removed from the base of this tank through line 68 may be combined with the filtrate or admixed with incoming lube stock for further dewaxing, but it may, of course, be dewaxed in a separate system or utilized for some purpose which does not require as low pour point as the main filtrate. It should be understood, of course, that some of the washed liquid may be removed with the filtrate and/or that the wash filtrate may be separated into various fractions of increasing wax content. This may be effected by adjusting slots 26, 27, etc., as is well known to those skilled in the art. Vapors may be removed from wash filtrate storage tank 67 through pressure-controlled valve 39A and pipe 69 to low pressure gas line 48.

The modification of my invention hereinabove described offers the important advantage that no fractionation or rectification systems are necessary to separate the shell gas from vaporized diluent. By employing one and the same material for diluent and shell gas I have greatly simplified the necessary equipment and by employing the critical pressures hereinabove described I obtain excellent yields of low pour point oils and I obtain dry wax cakes which are readily discharged from the filter, so that the entire process may be carried out in a continuous and very satisfactory manner. Using diluent ratios of about 3 to 1, filter pressure differentials of about 3 pounds per square inch, operating the filter at about ¼ revolution per minute to form a cake of about ⅛ to ¼ inch thickness, I can obtain filter rates of from 1 gallon to upwards of 4 gallons of oil per square foot of filter area per hour.

If higher pressures are desired in the filtration step, I have found that my improved apparatus is particularly well adapted for employing a non-condensable shell gas and such a modification is illustrated in Figure 3. The inert gas, which may be a lighter hydrocarbon such as ethane or which may be an inert gas such as nitrogen, carbon dioxide, or even air, may be introduced through line 70, together with recycled shell gases from line 71 to the inlet side of compressor 72. The compressed gases are then passed through cooler 73 for liquefying excess diluent and the cooled gases are introduced into separator 74, the liquid propane being returned through pipe 75 to propane storage tank 58 and the gases being recycled through line 76 to line 31 and thence to the filter. Excess pressure in separator 74 may be released through line 77. In some instances it may be unnecessary to employ a liquid separator at all and the compressed gases may be merely cooled in exchanger 78 and returned to the filter. I prefer, however, to employ the liquid separator because such a separator acts as a surge tank to insure a uniform pressure on the shell gases and it provides means for proportioning the amount of propane vapors which are returned to the filter with the shell gas. Thus by controlling the temperature in separator 74 I can return just enough propane with the shell gases to insure that the partial pressure of propane in the space between the filter shell and the filter drum is exactly the same as the partial pressure of the propane in the wax cake. In other words, I can use high filtering pressures without causing an excessive amount of condensation of propane on the filter cake or a large amount of propane vaporization from the filter cake. This is an extremely delicate procedure because excess propane condensation causes a resolution of wax, high pour point filtrates, clogged filters, etc. and a nexcess vaporization of propane causes disruption of the filter cake, clogging of the filter element, etc.

While I have described in detail the dewaxing of S. A. E. 50 Salt Creek distillate stock, it should be understood that the invention is equally applicable to other waxy oils including S. A. E. 10 and 20 stocks and even bright stocks or cylinder stocks. The amount of diluent propane required may vary with various stocks, but the optimum quantities for filterable mixes may be readily determined by preliminary tests. An important feature of my invention is the maintenance of a pressure on the filtrate side of the filter element which is at least equal to the vapor pressure thereof, so that there will be no flashing or boiling of the filtrate or propane from the inner side of the filter element. It is also a feature of my invention to employ a relatively small pressure differential which is preferably about two to eight or perhaps ten pounds in the case of propane. Of course, this pressure differential may be increased if an inert, non-condensable shell gas is employed and in that case I prefer to maintain the partial pressure of propane at about the same pressure as the vapor pressure of the wax cake mixture.

While I have described in detail a preferred embodiment of my invention it should be understood that I do not limit myself to any of the details hereinabove set forth except as defined by the following claims which should be construed as broadly as the prior art will permit.

I claim:

1. The method of separating wax from oil which comprises chilling a mixture of waxy oil and propane to solidify the wax and form a filterable oil-wax slurry diluted with propane, introducing said slurry to the feed bowl of a continuous filter, maintaining the pressure on the filtrate side of the continuous filter higher than the vapor pressure of the filtrate, continuously removing wax from the filter, heating and melting the wax at a point remote from said filter whereby diluent is vaporized, passing said diluent vapors countercurrent to said wax leaving the filter whereby the wax is warmed and the diluent is cooled, and returning said cooled diluent to said filter in contact with wax which is being removed.

2. The method of dewaxing oils in a system employing a continuous filter containing a rotary partially immersed filter element, which method comprises chilling a solution of wax-containing oil in a normally gaseous diluent to solidify the wax in readily filterable form and to make a cold slurry thereof in the liquefied normally gaseous diluent, introducing said cold slurry into said filter, simultaneously introducing as a pressuring fluid into said filter a condensable gas of substantially the same composition as said diluent, whereby a single fluid composition serves both as diluent and pressuring gas, and whereby the condensation of portions of the pressuring gas provides wash liquid on the non-immersed portion of the filter cake.

3. The method of claim 2 wherein the pressure on the filtrate side of the filter element is maintained above the vapor pressure of the filtrate.

4. The method of claim 2 wherein the pressure on the filtrate side of the filter element is above the vapor pressure of the filtrate and wherein a pressure differential of about 2 to 8 pounds is maintained across the filter element.

5. The method of dewaxing mineral oils in a system employing a continuous filter containing a rotary partially immersed filter element, which method comprises chilling a solution of wax-bearing oil in propane to solidify the wax in filterable form and to make a cold slurry thereof in the propane-oil solution, introducing said cold slurry into said filter, simultaneously introducing propane gas as a pressuring fluid, whereby propane serves both as a diluent and pressuring gas, and whereby the condensation of portions of the propane provides wash liquid on the non-immersed portion of the filter element.

6. The method of claim 5 which includes the step of maintaining a pressure on the filtrate side of the filter element which is greater than the vapor pressure of the filtrate.

7. The method of claim 5 which includes the steps of maintaining a pressure on the filtrate side of the filter element which is greater than the vapor pressure of the filtrate, and maintaining a pressure differential across the filter element of about 2 to 8 pounds per square inch.

8. The method of claim 5 wherein at least a part of the propane pressuring gas is introduced to the filter in direct contact with wax which is being removed from said filter.

ROY N. GILES.